April 21, 1953 H. O. PETERSON ET AL 2,636,115
FREQUENCY SHIFT DIVERSITY RECEPTION
Filed Dec. 22, 1949
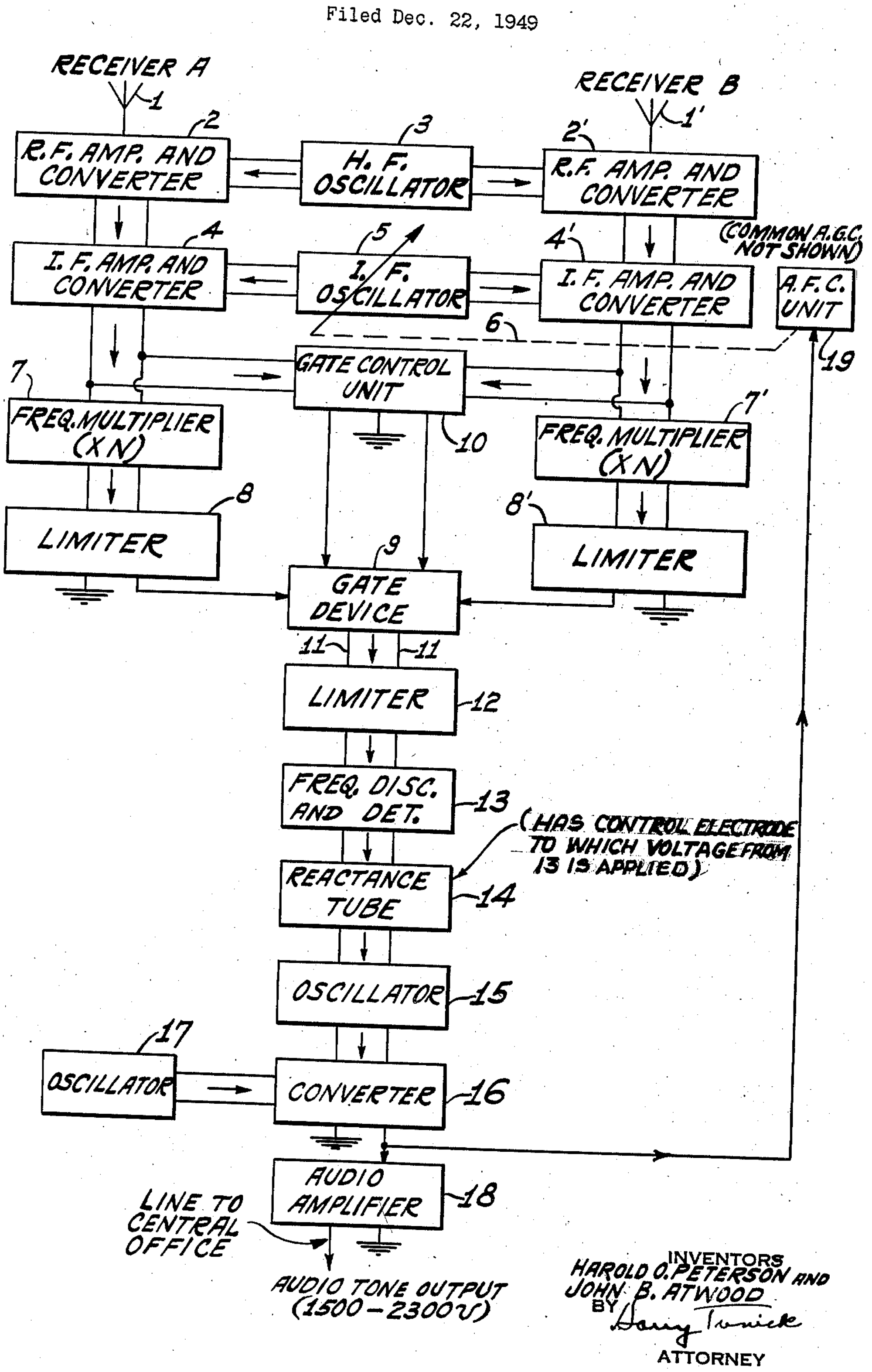
INVENTORS
HAROLD O. PETERSON AND
JOHN B. ATWOOD
BY Harry Tonick
ATTORNEY Patented Apr. 21, 1953

2,636,115

UNITED STATES PATENT OFFICE 2,636,115

FREQUENCY SHIFT DIVERSITY RECEPTION

Harold O. Peterson and John B. Atwood, Riverhead, N. Y., assignors to Radio Corporation of America, a corporation of Delaware Application December 22, 1949, Serial No. 134,542

6 Claims. (Cl. 250—8)

This invention relates to diversity receiving systems, and more particularly to such systems for receiving signals transmitted by shifting the frequency of a radio frequency carrier.

This invention is particularly applicable to the reception of facsimile or radiophoto signals which are transmitted by shifting the frequency of a radio frequency carrier, a total shift on the order of 800 cycles being utilized for the total tonal range from black to white in the picture. The invention will therefore be described herein in connection with a system for receiving radiophoto or facsimile signals.

It is desirable to make provisions at the receiver for obtaining the benefits achievable from the use of space diversity, such benefits as the effective elimination of random fading due to multipath transmission being rather well-known at the present time.

According to the method in common use at the present time for the transmission and reception of radiophoto signals, which may be termed the Sub-Carrier Frequency Modulation (SCFM) method, an audio frequency tone is shifted in frequency in accordance with the picture elements (from 1500 cycles for white to 2300 cycles for black) and this frequency shifted tone is used to amplitude modulate a carrier, the carrier and both side bands being transmitted. A diversity receiving system for a plurality of channels utilizing the SCFM method is disclosed in the copending Peterson application, Serial No. 634,350, filed December 11, 1945. Said Peterson application ripened on May 5, 1951 into Patent #2,553,271. In such a system for a single intelligence channel, the received signals from the diversity intermediate frequency amplifiers are each passed through a separate amplitude modulation detector in the output of each of which appears the frequency shifted tone of audio frequency. These tones are each passed through a separate audio frequency amplifier which is coupled to the corresponding detector, and then through a separate frequency discriminator and detector to a common gate device for diversity switching purposes, or a common frequency discriminator and detector may follow rather than precede the gate device.

As explained in the aforesaid application, the outputs of the diversity receivers may be out of phase when diversity switching from one receiver to the other takes place, and detection of the phase displaced currents results in distortion; this could be the case disclosed in Figure 2 of such application, where a common frequency discriminator and detector follows the gate device or gate tube and in which diversity switching takes place before detection. In the arrangement disclosed in Figure 2 of said application, the frequency shifted tones are multiplied in frequency before the same are applied to the gate device wherein output is switched from one diversity receiver to another, in order to reduce or substantially eliminate the effect of relative phase displacement in the frequency shifted tones derived from the two (or more) diversity receivers.

The present invention is based on the diversity receiving system, including means for reducing switching transients, described in Figure 2 of the aforesaid Peterson application. However, the receiver disclosed herein is designed for the reception of intelligence transmitted by the Radio Frequency Carrier Shift (RFCS) method, in which the radio frequency carrier is itself shifted in frequency in accordance with picture element light values.

In order to use as much of the existing central office equipment as possible, the RFCS receiver should supply at its output a "white frequency" of 1500 cycles and a "black frequency" of 2300 cycles to the central office, and the receiver output should shift between these two frequencies in response to a shift of 800 cycles on the received signal. For facsimile or radiophoto service, audio tone frequency must be present in the output of the receiver at each and every instant during the reception of the picture, in order to provide a picture with no gaps in the shading thereof. Also, for this service the receiver output frequency must be continuously variable throughout a range of frequencies, such as 1500 to 2300 cycles, to provide in the picture the various shades from white to black. Therefore, the tone keyer utilized in the receiver output in the aforesaid Peterson application cannot be used when the receiver is required for radiophoto or facsimile service, since such tone keyer sends keyed tone either frequency shift (in which case the frequency varies only between two discrete and fixed values and is not continuously variable over a range) or on-off (in which case there are gaps in the audio tone output of the receiver) to the central office.

Accordingly, an object of the present invention is to adapt the diversity receiver of the aforesaid Peterson application for facsimile or radiophoto service.

In addition, the aforesaid Peterson application discloses a frequency divider following the gate tubes, by means of which the frequency after multiplication is brought back down to a suitable value for transmission to the central office. Another object of the present invention is to render the frequency divider of the Peterson application unnecessary, thus reducing the cost of the equipment, while at the same time retaining the advantages of the prior arrangement as regards the reduction of transients resulting from phase displacement between signals when diversity switching takes place, these advantages being obtainable by the use of frequency multiplier prior to gating, as described previously.

The foregoing and other objects of the invention will be best understood from the following description of an exemplification thereof, reference being had to the accompanying drawing, wherein the single figure is a block diagram of a diversity receiving system according to this invention.

The objects of this invention are accomplished, briefly, in the following manner:

The transmitted radio frequency carrier, shifted in frequency in accordance with picture intelligence, is received on a pair of antennas in space or polarization diversity, each version being amplified, heterodyned to a first intermediate frequency, amplified, heterodyned to a second intermediate frequency and then multiplied in frequency (to reduce switching transients) and limited before being applied to a controlled gate device. The gate device is controlled by a gate control unit which is connected to, and responsive to, the outputs of the two intermediate frequency amplifiers. The switched output of the gate device is limited and fed to a discriminator-detector circuit. The resulting rectified output is applied to a reactance tube which controls the frequency of an oscillator the output of which is then converted or heterodyned to the proper frequency range so that the final output covers the desired audio range. The output of the receiver is an audio tone or audio frequency which is frequency shifted in accordance with picture intelligence. This audio tone output is sampled in an automatic frequency control unit which controls the frequency of the intermediate frequency oscillator for the second heterodyning.

Referring now to the drawing, the diversity receiving system of this invention begins with two receiving antennas 1 and 1' which are in space or polarization diversity and which pick up different versions of the RFCS radiophoto or facsimile signal which is transmitted from the distant transmitting station. The antenna 1 of receiver A feeds a radio frequency amplifier 2 while antenna 1' of receiver B feeds a radio frequency amplifier 2'. The radio frequency amplifiers 2 and 2' are of the heterodyne type having a common high frequency oscillator 3 coupled thereto and including converters, whereby the incoming radio frequency carrier, which may have a mean frequency of 15 megacycles (plus or minus the frequency deviation determined by the light values of the picture being transmitted), is converted or heterodyned to a mean first intermediate frequency, such as 450 kilocycles, for example. The first intermediate frequency in each receiver is amplified in the intermediate frequency amplifiers 4 and 4', respectively, which are of the heterodyne type having a common intermediate frequency oscillator 5 coupled thereto and including converters whereby the first intermediate frequency, having a maximum frequency shift of 800 cycles, for example (which is the same as the maximum frequency shift of the radio frequency carrier), is converted or heterodyned down to a mean second intermediate frequency such as 50 kilocycles. Oscillator 5 is adapted to have its frequency controlled by external means, as indicated in the drawing at 6.

The two versions, having a center frequency such as 50 kilocycles, are fed into respective frequency multipliers or harmonic generators 7 and 7', which produce waves of substantially sinusoidal shape in their outputs, and then into respective limiters 8 and 8', which are preferably as illustrated in the copending Schock et al. application, Serial No. 632,978, filed December 5, 1945, now Patent #2,515,668, dated July 18, 1950, or in Crosby Patent 2,276,565, dated March 17, 1942.

The limited frequency multiplied signal versions are fed into a common gate device 9. Gate device 9 consists of a pair of gating tubes corresponding to those numbered 80 and 80' in said Schock et al. application, and arranged and connected as described therein. These gating tubes have their #1 grids connected to the corresponding output leads of a gate control unit 10, and have their #3 grids connected to the corresponding output leads of multipliers 8 and 8'. Such gating tubes function to select output from that receiver getting the better or stronger signal at any particular instant.

The gate control unit 10 is connected to the outputs of the two intermediate frequency amplifiers 4 and 4' in such a way as to be responsive thereto. Unit 10 includes a differential rectifier and double trigger circuit as shown and described in the said Schock et al. application, output from receiver A and receiver B being supplied to a differential detector in unit 10 wherein the magnitudes of the outputs are compared and a direct potential is produced which varies in one direction when the signal in receiver B is the better, and in another direction when the signal in receiver A is the better of the two. This signal strength comparing means corresponds fully with the said means as described in the aforementioned Schock et al. application. This potential operates to trigger a double locking circuit (in 10) to increase (make less negative) the potential on the #1 grid of one or the other of the two gate tubes in device 9, and decrease (make more negative or less positive) the potential on the #1 grid of the other of the gate tubes so that if receiver A gets the better signal one gate tube is opened up and the other is closed, while if receiver B gets the better signal the one gate tube is closed and the other is opened up. Another way to consider the operation of the gate device 9 is to assume that the two tubes therein are biased to cut off and one or the other thereof turned on by the control potential from 10.

The frequency multipliers 7 and 7' multiply the input frequency supplied thereto by a certain predetermined multiplication factor N. for example, if the currents out of the converters 4 and 4' have a frequency of 50 kilocycles $\pm FS$ (FS being the amount of frequency deviation due to the signal intelligence), after multiplication the currents out of frequency multipliers 7 and 7' will have a frequency of $N(50\text{ kc.} \pm FS)$; in other words, the deviation due to the signal intelligence is also multiplied by N. The factor N may have any suitable value, such as sixteen or thirty-two, for example.

As previously described, the gate device 9 automatically selects the better (or stronger) of the two signal versions and passes it on to the rest of the circuit, the selected version appearing in the output leads 11 of device 9. The selected signal version appearing at output leads 11 is fed through a limiter 12, which eliminates undesired amplitude variations and which may be of the same type as limiters 8 and 8', to a frequency discriminator and detector circuit 13 which may be for example of the type disclosed in Seeley Patent 2,121,103. The output of circuit 13 consists of a direct current, reproducing the frequency shift modulation applied to said circuit as variations in amplitude of such direct current.

The direct current output of detector 13 is applied to the grid of a conventional reactance tube 14 which varies or controls the frequency of an oscillator 15. For example, the reactance tube 14 is a voltage-responsive variable reactance comprising an electron control device having a control electrode and connected to simulate a reactance, as shown in Fig. 4 of Seeley Patent #2,121,103, above referred to. This electron control device is coupled to the oscillator 15 in the manner shown in said Seeley patent, and the direct voltage output of the detector 13 is applied to the control electrode or grid of the reactance tube or electron control device 14, also as shown in said Seeley patent. The varying-frequency or modulated frequency output of oscillator 15 is fed to a converter 16 which is of the heterodyne type having an oscillator 17 coupled thereto. The converter 16 heterodynes the frequency-shifted output of oscillator 15 to a center or mean frequency of 1900 cycles, so that the output of such converter is audio tone or audio frequency which varies from 1500 to 2300 cycles in accordance with the signal intelligence or picture values, this final output covering the desired audio range. This frequency shifted audio tone, the frequency shift of which is the same as the modulation applied at the transmitter, is amplified in audio amplifier 18, from whence it goes to the central office.

An automatic frequency control unit 19 has its input coupled to the output of converter 16 to sample the same. This unit is preferably constructed and arranged as disclosed in the copending Atwood application, Serial No. 119,971, filed October 6, 1949, and operates by means of control coupling 6 (which controls the frequency of intermediate frequency oscillator 5) to maintain the "black frequency" in the receiver output at its proper value of 2300 cycles.

As explained previously, the deviation due to the signal is multiplied by N (the multiplication factor of the multipliers) in the output of frequency multipliers 7 and 7'. The maximum transient deviation due to the switching action is not increased, however, because the instantaneous phase difference between the two versions (in receivers A and B) cannot exceed 180 degrees at the instant of switching. The frequency of each version is multiplied by a sufficient order of multiplication to cause the switching transients to become relatively small as compared to the signal and consequently the switching transients have little or no effect in the output of detector 13. The signalling currents out of receivers A and B may be out of phase when the gating action is taking place, but this phase displacement cannot exceed 180 degrees. By multiplying the frequency of the currents supplied by receivers A and B before the gating action takes place, the deviations thereof due to signal intelligence are increased an amount depending upon the multiplication factor N. The frequency deviation occasioned by the out-of-phase relation, however, is not correspondingly increased by the multiplication. When multiplied, these currents are subjected to discrimination and detection by unit 13 at the output of the gating tubes in gate device 9. After multiplication, the current variations due to distortion superimposed on the signal are small as compared to the signal currents.

The above operation, that is, the reduction of switching transients by the use of frequency multipliers, is explained somewhat more fully in the aforementioned Peterson application, in connection with Figure 2 thereof. It will be observed that, in the present invention, the advantages obtainable by the carrying on of switching or gating at multiplied frequencies have been retained, while at the same time eliminating the frequency divider disclosed in Figure 2 of the said Peterson application.

By utilizing an oscillator 15 controlled by reactance tube 14 in turn controlled by the direct current output of the receiver discriminator and detector, tone frequency is continuously present in the output of the receiver, and also, this tone is continuously variable throughout the desired frequency range (due to the characteristic operation of the reactance-tube-controlled oscillator).

What we claim to be our invention is:

1. A diversity system for receiving frequency shifted carrier energy of radio frequency, comprising a pair of radiant energy intercepting devices having different interception characteristics, a separate receiver coupled to each of said devices, said receivers each including converting means for converting the energy in each receiver to a frequency in the intermediate frequency range, a frequency multiplier for each converting means, means coupling the intermediate frequency output of each converting means to a respective frequency multiplier, a common gate device for both of said multipliers, means coupling the outputs of said multipliers to said gate device, said gate device being controllable to pass one or the other of such outputs to a common output circuit, signal strength sensing means excited by the signals in each of said receivers for producing a control potential the character of which depends upon which of the two signals is stronger, means for controlling said gate device by said control potential, whereby such device passes the stronger of the two multiplier outputs to said circuit, a discriminator-detector in said circuit coupled to receive the output of said gate device and to derive therefrom a variable amplitude direct voltage, an oscillator, a voltage-responsive variable reactance coupled to said oscillator for controlling the frequency thereof, and means for applying said derived direct voltage to said reactance to vary the same and control the frequency of said oscillator.

2. A system in accordance with claim 1, wherein the voltage-responsive reactance is an electron control device having a control electrode and connected to simulate a reactance and wherein the derived direct voltage is applied to said control electrode.

3. A system in accordance with claim 1, wherein the coupling between the discriminator-detector and the gate device includes a limiter, wherein the voltage-responsive reactance is an electron control device having a control electrode and connected to simulate a reactance and wherein the derived direct voltage is applied to said control electrode.

4. A diversity system for receiving frequency shifted carrier energy of radio frequency, comprising a pair of radiant energy intercepting devices having different interception characteristics, a separate receiver coupled to each of said devices, said receivers each including converting means for converting the energy in each receiver to a frequency in the intermediate frequency range, a frequency multiplier for each converting means, means coupling the intermediate frequency output of each converting means to a respective frequency multiplier, a common gate device for both of said multipliers, means coupling the outputs of said multipliers to said gate device, said gate device being controllable to pass one or the other of such outputs to a common output circuit, signal strength sensing means excited by the signals in each of said receivers for producing a control potential the character of which depends upon which of the two signals is stronger, means for controlling said gate device by said control potential, whereby such device passes the stronger of the two multiplier outputs to said circuit, a discriminator-detector in said circuit coupled to receive the output of said gate device and to derive therefrom a variable amplitude direct voltage, an oscillator, a voltage-responsive variable reactance coupled to said oscillator for controlling the frequency thereof, means for applying said derived direct voltage to said reactance to vary the same and control the frequency of said oscillator, and heterodyning means coupled to the output of said oscillator to convert such output to a desired frequency in the audio range.

5. A system in accordance with claim 4, wherein the voltage-responsive reactance is an electron control device having a control electrode and connected to simulate a reactance and wherein the derived direct voltage is applied to said control electrode.

6. A system in accordance with claim 4, wherein the coupling between the discriminator-detector and the gate device includes a limiter, wherein the voltage-responsive reactance is an electron control device having a control electrode and connected to simulate a reactance and wherein the derived direct voltage is applied to said control electrode.

HAROLD O. PETERSON.
JOHN B. ATWOOD.

References Cited in the file of this patent

UNITED STATES PATENTS

| Number | Name | Date |
|---|---|---|
| 1,922,282 | Bellescize | Aug. 15, 1933 |
| 1,968,750 | Edwards | July 31, 1934 |
| 2,253,832 | Whitaker | Aug. 26, 1941 |
| 2,306,687 | Cox | Dec. 29, 1942 |
| 2,321,269 | Artzt | June 8, 1943 |
| 2,443,746 | Peterson | June 22, 1948 |
| 2,491,810 | Guanella | Dec. 20, 1949 |
| 2,504,884 | Schock | Apr. 18, 1950 |